United States Patent
Gupta et al.

(10) Patent No.: US 10,833,767 B2
(45) Date of Patent: Nov. 10, 2020

(54) SELF-HOMODYNE CARRIER MULTIPLEXED TRANSMISSION SYSTEM AND METHOD FOR COHERENT OPTICAL LINKS

(71) Applicant: Indian Institute of Technology Bombay, Mumbai (IN)

(72) Inventors: Shalabh Gupta, Mumbai (IN); Rashmi Kamran, Mumbai (IN); Anghan Mehul Popatbhai, Mumbai (IN)

(73) Assignee: INDIAN INSTITUTE OF TECHNOLOGY BOMBAY, Mumbai (IN)

( * ) Notice: Subject to any disclaimer, the term of this patent is extended or adjusted under 35 U.S.C. 154(b) by 0 days.

(21) Appl. No.: 16/237,957

(22) Filed: Jan. 2, 2019

(65) Prior Publication Data
US 2019/0229811 A1 Jul. 25, 2019

(30) Foreign Application Priority Data
Jan. 24, 2018 (IN) .............................. 201821002887

(51) Int. Cl.
*H04B 10/60* (2013.01)
*H04B 10/532* (2013.01)
*H04B 10/63* (2013.01)
*H04B 10/25* (2013.01)
*H04J 14/06* (2006.01)
*H04B 10/556* (2013.01)
*H04B 10/61* (2013.01)

(52) U.S. Cl.
CPC .......... *H04B 10/532* (2013.01); *H04B 10/25* (2013.01); *H04B 10/556* (2013.01); *H04B 10/614* (2013.01); *H04B 10/63* (2013.01); *H04J 14/06* (2013.01); *H04B 10/60* (2013.01); *H04B 10/6151* (2013.01); *H04B 10/6166* (2013.01)

(58) Field of Classification Search
CPC ...... H04B 10/532; H04B 10/63; H04B 10/25; H04B 10/556; H04B 10/614; H04B 10/6151; H04B 10/6166; H04B 10/60; H04J 14/06
USPC ... 398/43–103, 140–172, 182–201, 202–214
See application file for complete search history.

(56) References Cited

U.S. PATENT DOCUMENTS 5,052,051 A * 9/1991 Naito ..................... H04B 10/61
  398/204
5,473,457 A * 12/1995 Ono ....................... G02B 6/278
  385/11

(Continued)

OTHER PUBLICATIONS

Chen et al, Microwave vector signal transmission over an optical fiber based on IQ modulation, Mar. 2014, Optics Letters, All Document. (Year: 2014).*

(Continued)

*Primary Examiner* — Dibson J Sanchez

(57) ABSTRACT

Embodiments herein provide a self-homodyne coherent optical transmission system (Self-Homodyne system) where an optical carrier is polarization multiplexed with a modulated signal and is transmitted over the optical fiber. An Adaptive polarization control is used by the receiver for simplifying a signal processing in the receiver. Analog processing may be used for implementing LO less receiver. Transmitter uses a phase modulated carrier in place of an unmodulated carrier.

13 Claims, 8 Drawing Sheets

(56) References Cited

U.S. PATENT DOCUMENTS

| | | | | |
|---|---|---|---|---|
| 6,634,808 B2* | 10/2003 | Glingener | H04B 10/532 | 398/152 |
| 6,728,491 B1* | 4/2004 | Ooi | H04B 10/2507 | 398/147 |
| 6,782,211 B1* | 8/2004 | Core | H04B 10/60 | 398/205 |
| 6,850,712 B1* | 2/2005 | Delavaux | H04B 10/2537 | 398/183 |
| 7,127,166 B2* | 10/2006 | Glingener | H04B 10/532 | 398/65 |
| 7,522,785 B2* | 4/2009 | Yao | G01M 11/337 | 356/364 |
| 7,796,894 B1* | 9/2010 | Yao | H04B 10/2569 | 398/152 |
| 7,826,752 B1* | 11/2010 | Zanoni | H04B 10/5055 | 398/186 |
| 8,000,610 B2* | 8/2011 | Yao | H04B 10/0795 | 398/152 |
| 8,131,160 B2* | 3/2012 | Toyoshima | H04B 10/118 | 398/202 |
| 8,265,483 B2* | 9/2012 | Saperstein | H04J 14/06 | 398/147 |
| 9,031,418 B2* | 5/2015 | Yuki | H04B 10/0775 | 398/184 |
| 9,203,517 B2* | 12/2015 | Zhou | H04B 10/614 | |
| 9,231,727 B2* | 1/2016 | Xia | H04J 14/06 | |
| 9,735,916 B2* | 8/2017 | Izumi | H04B 10/671 | |
| 9,819,420 B2* | 11/2017 | Wen | H04B 10/2572 | |
| 2001/0033724 A1* | 10/2001 | Kato | G02B 6/02004 | 385/123 |
| 2003/0175033 A1* | 9/2003 | Taga | H04B 10/2572 | 398/152 |
| 2004/0016874 A1* | 1/2004 | Rao | G02F 1/0136 | 250/225 |
| 2005/0047780 A1* | 3/2005 | Hoshida | H04B 10/67 | 398/33 |
| 2005/0117915 A1* | 6/2005 | Miyazaki | H04B 10/5051 | 398/188 |
| 2005/0265727 A1* | 12/2005 | Glingener | H04J 14/06 | 398/152 |
| 2005/0265728 A1* | 12/2005 | Yao | H04J 14/06 | 398/152 |
| 2007/0134001 A1* | 6/2007 | Kim | H04B 10/532 | 398/155 |
| 2007/0140701 A1* | 6/2007 | Riposati | G02F 1/0136 | 398/152 |
| 2007/0253053 A1* | 11/2007 | Suzuki | G02B 27/286 | 359/239 |
| 2007/0274728 A1* | 11/2007 | Bergano | H04J 14/06 | 398/152 |
| 2008/0138070 A1* | 6/2008 | Yan | H04J 14/06 | 398/65 |
| 2008/0232816 A1* | 9/2008 | Hoshida | H04B 10/532 | 398/152 |
| 2010/0098420 A1* | 4/2010 | Ibragimov | H04B 10/0775 | 398/65 |
| 2010/0111530 A1* | 5/2010 | Shen | H04B 10/2572 | 398/65 |
| 2010/0150555 A1* | 6/2010 | Wang | H04J 14/06 | 398/65 |
| 2010/0166423 A1* | 7/2010 | Chang | H04J 14/06 | 398/65 |
| 2010/0316393 A1* | 12/2010 | Schmidt | H04B 10/61 | 398/205 |
| 2011/0182572 A1* | 7/2011 | Klekamp | H04B 10/07951 | 398/25 |
| 2011/0206375 A1* | 8/2011 | Xiong | H04J 14/06 | 398/65 |
| 2011/0222853 A1* | 9/2011 | Tanaka | H04B 10/50575 | 398/65 |
| 2012/0207475 A1* | 8/2012 | Tian | H04B 10/5561 | 398/65 |
| 2012/0207476 A1* | 8/2012 | Agrell | H04B 10/50 | 398/65 |
| 2012/0287949 A1* | 11/2012 | Webb | H04B 10/5162 | 370/536 |
| 2013/0034354 A1* | 2/2013 | Okamoto | H04B 10/6151 | 398/65 |
| 2014/0126916 A1* | 5/2014 | Ota | H04B 10/2569 | 398/152 |
| 2015/0117872 A1* | 4/2015 | Lyubomirsky | H04J 14/06 | 398/205 |
| 2015/0215049 A1* | 7/2015 | Tateiwa | H04B 10/6162 | 398/208 |
| 2015/0244331 A1* | 8/2015 | Hwang | H03F 3/08 | 330/308 |
| 2016/0065314 A1* | 3/2016 | Nazarathy | H04B 10/64 | 398/202 |

OTHER PUBLICATIONS

Fatadin et al, DSP Techniques for 16 QAM Coherent Optical Systems, Aug. 2010, IEEE, All Document. (Year: 2010).*

Singh et al, Stokes Vector Based Self Coherent Detection for Power Efficient Optical Interconnect, Dec. 2016, International Conference on Fibre Optics and Photonics, paper Th3A.41, All Document. (Year: 2016).*

Kamran et al, Signal processing technique for QPSK system with polarization multiplexed carrier, Dec. 2016, International Conference on Fibre Optics and Photonics, paper W3A.76, All Document. (Year: 2016).*

Heismann, Analysis of a Reset Free Polarization Controller for Fast Automatic Polarization Stabilization, Apr. 1994, JOLT, vol. 12 No. 4, All Document. (Year: 1994).*

Singh, Novel secure and bandwidth efficient optical code division multiplexed system, Dec. 2016, Optical Fiber Technology, All Document. (Year: 2016).*

* cited by examiner

SELF-HOMODYNE CARRIER MULTIPLEXED TRANSMISSION SYSTEM AND METHOD FOR COHERENT OPTICAL LINKS

FIELD OF INVENTION

The present disclosure, in general, relates to a self-homodyne coherent optical system and more particularly, to a self-homodyne transmission system for coherent optical links. The present application is based on, and claims priority from an Indian application No. 201821002887 filed on Jan. 24, 2018 the disclosure of which is hereby incorporated by reference herein.

BACKGROUND

With an advancement in technology, data exchange has increased drastically. Cloud computing services, online video streaming, and vast usage of internet has imposed a huge traffic growth in datacenter networking. The traffic growth in turn pushes data rate requirements at datacenters to a large extent. Power efficient communication systems are thus required for contributing in cost savings and power savings at the data centers.

For implementing high speed data interconnects up to 100 Gb/s, an optical fiber channel is widely used. One solution for providing the power efficient communication system proposes an Intensity Modulation based Direct Detection (IMDD) in optical systems because of simple hardware and less signal processing requirements. However, performance of the IMDD systems may be degraded due to chromatic dispersion for data rate distance product of above 1000 Gb·km/s. The usage of spectrum by the IMDD based system also lacks efficiency.

Further, combined phase shift codes may be used for extending limit of data rate distance product for IMDD systems, however, generation of the combined phase shift codes is complex and thus is not a feasible solution. Therefore, IMDD based systems may not be a suitable solution for high data rate requirements in future.

As an alternate solution, coherent systems may also be used as the coherent systems carries information in each of an amplitude and phase of carrier. However, the coherent systems require analog to digital converters with digital signal processing and so are associated with high power consumption and thus may not be cost efficient.

SUMMARY

The principal object of the embodiments herein is to provide a self-homodyne transmission system (self-homodyne coherent optical transmission system) for coherent optical links.

Another object of the invention herein is to provide a receiver using an adaptive polarization control for simplifying a signal processing at the receiver in the self-homodyne transmission system for the coherent optical links.

Another object of the invention herein is to provide a transmitter for providing a phase modulated carrier, in the self-homodyne transmission system for the coherent optical links.

Accordingly, embodiments herein provide a self-homodyne coherent optical transmission system. The self-homodyne coherent optical transmission system comprises a transmitter and a receiver. The transmitter comprises a laser for generating an optical carrier, a polarization beam splitter for splitting the optical carrier into two orthogonal polarizations and at least one modulator for modulating a polarization signal for one of the two orthogonal polarizations. The transmitter further comprises a polarization beam combiner for combining an unmodulated carrier in other polarization with a modulated signal, wherein an output of the polarization beam combiner is transmitted through a fiber channel. The optical carrier in one polarization is multiplexed with a message signal modulated over the carrier in another polarization and is transmitted over the fiber channel. The receiver is configured for receiving a message signal from the transmitter and demodulating the message signal by using a polarization multiplexed carrier as a local oscillator. The receiver comprises at least one 90° optical hybrid for combining a carrier and a modulated signal, at least two balanced photo-detectors for converting an optical output of the at least one optical hybrid into electrical signals and a polarization controller for applying an adaptive polarization control mechanism for separating the modulated signal and the carrier at the receiver in two independent polarization components.

Embodiment herein also provide a receiver configured for receiving a message signal from a transmitter and demodulating the message signal by using a polarization multiplexed carrier as a local oscillator. The receiver comprises at least one 90° optical hybrid for combining a carrier and a modulated signal, at least two balanced photo-detectors for converting an optical output of the at least one optical hybrid into electrical signals and a polarization controller for applying an adaptive polarization control mechanism for separating the modulated signal and the carrier at the receiver in at least two independent polarization components.

Embodiment herein also provide a method for transmitting signal in a self-homodyne coherent optical transmission system. The method comprises generating, through a laser in a transmitter, an optical carrier, splitting, through a polarization beam splitter, the optical carrier into two orthogonal polarizations and modulating one polarization, through at least one modulator, a polarization signal for one of the two orthogonal polarizations. The method further comprises combining, through a polarization beam combiner, an unmodulated carrier in other polarization with a modulated signal. An output of the polarization beam combiner is transmitted to a receiver through a fiber channel. The optical carrier in one polarization is multiplexed with a message signal modulated over the carrier in another polarization and is transmitted over the fiber channel.

Embodiment herein also provide a method for receiving signal in a self-homodyne coherent optical transmission system. The method comprises receiving, through a receiver, a message signal from a transmitter and demodulating the message signal by using a polarization multiplexed carrier as a local oscillator and combining, through a polarization controller, an adaptive polarization control mechanism for separating the modulated signal and the carrier at the receiver in at least two independent polarization components, through at least one 90° optical hybrid, a carrier and a modulated signal are combined with a phase shift. The method further comprises converting, through at least two balanced photo-detectors, an optical output of the at least one optical hybrid into electrical signals.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The present disclosure relates to a self-homodyne coherent optical transmission system (coherent optical transmission system) also referred as a Self-Homodyne (SH) system. The SH system transmits carrier along with a modulated signal. The receivers in the SH system may not require a Local Oscillator (LO) and carrier phase recovery. The receiver without LO may result in a low power and low-cost receiver. In the SH system, a transmitter may function without requiring an expensive laser as the self-homodyne optical transmission systems are line width tolerant.

For the coherent optical transmission system of the present disclosure, an optical carrier in the coherent optical transmission system is in one polarization and is multiplexed with a message signal modulated over a carrier in another polarization and is transmitted over an optical fiber. The self-homodyne optical coherent transmission system comprises a transmitter using a phase modulated carrier and a receiver using an adaptive polarization control for simplifying signal processing at the receiver. An adaptive polarization control is a feedback control system intelligent enough to adjust its characteristics in a dynamic environment to satisfy specific criteria.

Figure 1:
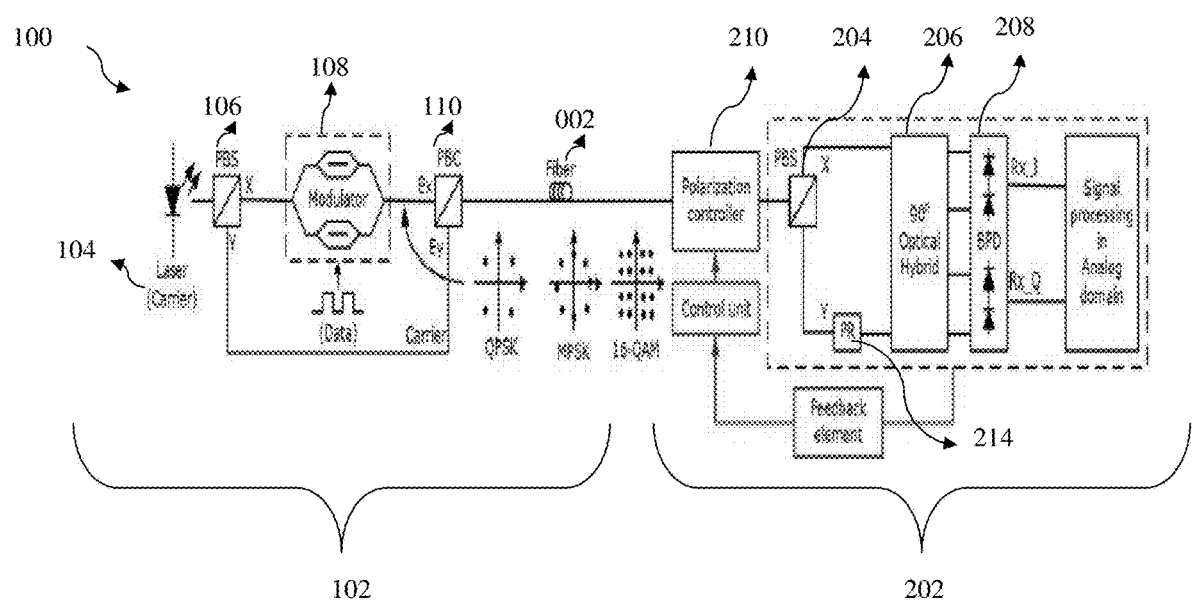
FIG. 1 illustrates a structure of a self-homodyne coherent optical transmission system with a polarization multiplexed carrier, according to an embodiment as disclosed herein.

In accordance with an embodiment, referring to FIG. 1, an architecture of the self-homodyne optical coherent transmission system 100 is shown. The self-homodyne optical coherent transmission system 100 comprises the transmitter 102 and a receiver 202.

The transmitter 102 comprises a laser 104, a Polarization Beam Splitter (PBS) 106, at least one modulator 108, and a Polarization Beam Combiner (PBC) 110.

The receiver 202 of the coherent optical transmission system 100 comprises at least one optical hybrid 206, at least two balanced photo detectors 208, and an electrically controlled polarization controller 210.

Referring to the FIG. 1, configuration of the transmitter 102 is shown. The transmitter 102 is configured for transmitting a message signal to the receiver 202. The laser 104 in the transmitter 102 is arranged for generating an optical carrier. The laser 104 comprises a continuous wave laser and is arranged as an optical source. The output of the laser 104 is connected to the PBS splitter 106. The PBS 106 separates an X polarization and a Y polarization from the optical carrier. Carrier signal from one polarization and de-interleaved data streams are then applied to the at least one optical modulator 108 (hereafter referred as modulator 108).

The modulator 108 of the transmitter 102 is one of the important component. The modulator 108 functions based on a modulation technique. The modulation technique comprises at least one of a Quadrature Phase Shift Keying (QPSK) modulation technique, an M-ary Phase Shift Keying (m-PSK) modulation technique, and a Quadrature Amplitude Modulation (m-QAM) modulation technique. The modulator 108 applies the QPSK modulation technique and the m-PSK modulation technique for changing only phase of the carrier signal according to a modulating signal.

The modulator 108 may apply the QPSK modulation technique, for assigning four possible values to the phases to symbols in the carrier signal. The modulator 108 may increase a bit rate by a factor of two over intensity modulation by applying the QPSK modulation technique. The QPSK modulation technique is having a narrow optical spectrum and therefore, may be considered as a popular M-ary phase modulation format.

In an example embodiment, the modulator 108 may comprise two Mach-Zehnder modulators (MZM) nested together for applying the QPSK modulation technique in the coherent optical transmission system 100. The two (MZM)

implements the modulation technique for generating different phases according to the applied symbols in the carrier signal. Each of the QPSK modulation technique and the MZMs are biased at a null voltage for obtaining the phase shifts of the carrier signal at −90° and 90°. The output of the modulator 108 may be represented as:

$$V_{out} = V_{in}\left[\cos\left(\frac{\pi c_x(t)}{V_c}\right) + j\cos\left(\frac{\pi c_y(t)}{V_C}\right)\right] \quad \text{Equation (1)}$$

In equation (1), $c_x(t)$ and $c_y(t)$ refer to applied control voltages and $V_c$ is characteristics voltage.

Let $A=\cos(\pi c_x(t)/V_c)$ and $B=\cos(\pi c_y(t)/V_c)$, the output of the modulator 108 may be written as:

$$V_{out} = V_{in}\left[\sqrt{A^2 + B^2}\right]e^{j\tan^{-1}\left[\frac{B}{A}\right]} \quad \text{Equation (2)}$$

In a similar way, the modulator 108 may also generate an m-PSK signal for m value of phases. When modulator 108 uses the QAM based modulation technique, different levels of amplitude along with different phases may be assigned to the symbols in the carrier signal. 16-QAM may be generated by applying a high speed in-phase signal and quadrature phase signal to the modulator 108. The modulator 108 transmits the output (modulated output) to the PBC 110 for combining the modulated signal in one polarization with the carrier in another polarization. The output of the PBC 110 is then transmitted to an optical channel through a fiber 002.

In an embodiment, the channel in the transmitter 102 may comprise an optical dispersion compensation technique. The channel in the transmitter 102 may comprise a dispersion shifted fiber for compensating the effect of dispersive optical channel. Wavelength with less dispersion characteristics may be applied for extending a capacity of transmission of the transmitter 102.

In an embodiment, referring to FIG. 1, configuration of the receiver 202 is shown. The receiver 202 is configured for receiving the message signal from the transmitter 102. The receiver 202 does not require a Local Oscillator (LO) and uses the adaptive polarization control for simplifying the signal processing.

The receiver 202 demodulates the message signal by using a polarization multiplexed carrier as the local oscillator. The PBS 204 of the receiver 202 splits the message signal (incoming signal) into two orthogonally polarized signals and transmits the two orthogonally polarized signals to the at least one 90° optical hybrid 206. A polarization rotator 214 may be used for getting the two orthogonally polarized signals in a same polarization before applying to the 90° optical hybrid 206.

The 90° optical hybrid 206 is used to combine a local oscillator (LO) signal with the message signal to generate an in-phase component and a quadrature-phase component.

The 90° optical hybrid 206 couples the two optical signals and provides an output with a phase shift introduced between the two optical signals. The output generated by the 90° optical hybrid 206 may have an amplitude error and a phase error.

The outputs of the 90° optical hybrid 206 is then applied to the at least two balanced photo detectors 208 for generating electrical signals for each of the two optical signals. Use of balanced photo detectors 208 gives an advantage in terms of the receiver sensitivity in the receiver 202.

The four currents generated through the 90° optical hybrid 206 at the output of the at least two balanced photo detector 208 is shown below:

$$\begin{pmatrix} i_1 \\ i_2 \\ i_3 \\ i_4 \end{pmatrix} = \begin{pmatrix} [E_x + E_y][E_x + E_y]^* \\ [E_x - E_y][E_x - E_y]^* \\ [E_x + jE_y][E_x + jE_y]^* \\ [E_x - jE_y][E_x - jE_y]^* \end{pmatrix},$$

The above matrix of four currents includes represents a modulated signal and a carrier signal. Complex valued electric field in x polarization (Ex) represents the modulated signal and complex valued electric field in y polarization (Ey) represents the carrier signal. The electric field representation of the modulated signal ($E_x$) and the carrier signal ($E_y$) is shown below in Equation (3):

$$E_x = A_S e^{(w_c t + \theta_m)},$$

$$E_y = A_{LO} e^{(w_c t)}, \quad \text{Equation (3)}$$

In Equation (3) above, we refers to a carrier frequency and θm refers to an angle containing phase information according to the transmitted signal. An amplitude of the modulated signal is required be less than the carrier signal ($A_S \ll A_{LO}$) for a good coherent reception. Mathematical expressions discussed above are eligible for the MPSK modulation technique and may also be extended for the QAM modulation technique to be used by the modulator 108 of the transmitter 102. If it is assumed that the polarization control applied by the receiver 202 is ideal, then the in phase component and the quadrature components of received signal may be derived as:

$$R_{X_I} = I_1 - I_2 = 4A_{LO}A_S \cos\theta_m,$$

$$R_{X_Q} = I_3 - I_4 = 4A_{LO}A_S \sin\theta_m. \quad \text{Equation (4)}$$

Equation (4) as discussed above shows the output electrical signals generated by the at least two photo detectors 208 of the receiver 202. The output electrical signals may be processed by an equalizer for removing effects of the optical fiber channel impairments. The equalizer may comprise at least one of Constant Modulus Algorithm (CMA) equalizer, and a Decision Feedback Equalizer (DFE).

In case the receiver 202 does not apply the polarization control over the message signal received from the transmitter 102, then an effect of cross polarization may be observed. The effect of the cross polarization may be corrected by separating modulated signal and the carrier at the receiver 202. An adaptive control of angles of polarization controller 210 may correct the effect of cross polarization. For example, a voltage controlled polarization controller may be used as the polarization controller 210 for the control of the angle of polarization.

Figure 2:
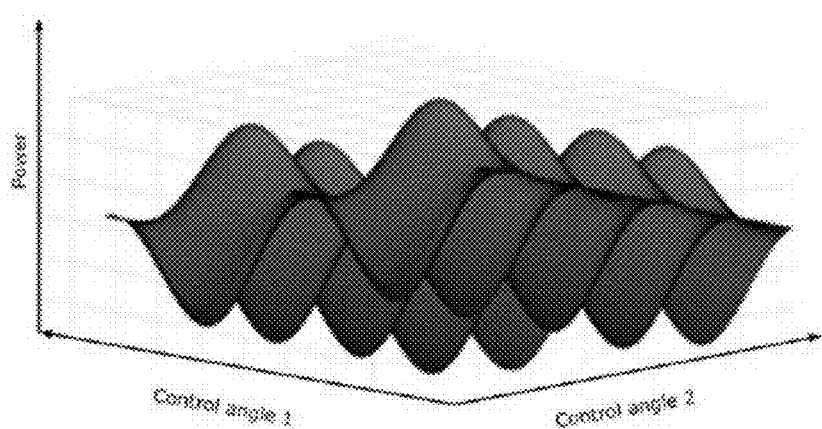
FIG. 2 illustrates a relationship between tow angles of polarization controller with maxima and minima of power value in one polarization, according to an embodiment as disclosed herein.

Referring to FIG. 2, a Minimization of power in one polarization for separating the carrier and modulated signal from the message signal receiver from the receiver 202 is shown. Minimization of power in one polarization for polarization demultiplexing is implemented for the coherent transmission system 100 with a polarization multiplexed carrier.

A relationship between two control angles of polarization control with power in each polarization is shown in FIG. 2. By minimizing power in one polarization, state of polarization may achieve a linear state of polarization. The Linear state of polarization is a desired state at polarization. Difference in power is observed and control voltage of polarization controller 212 may be varied accordingly to adjust two angles (control angle 1 and control angle 2) of the polarization controller 212. Relationship between the two angles of a three wave polarization controller 212 (the polarization controller) with each of a maxima and a minima of the power values is shown in FIG. 2.

For some values of the control angles of the polarization controller 212, a power in the one polarizations at the output of the PBS 204 converges to a minimum value and power in other polarization converges to a maximum value. When the power in the one polarization reaches to minima then the power in the other polarization reaches to maxima as a total power is a constant.

Figure 3:
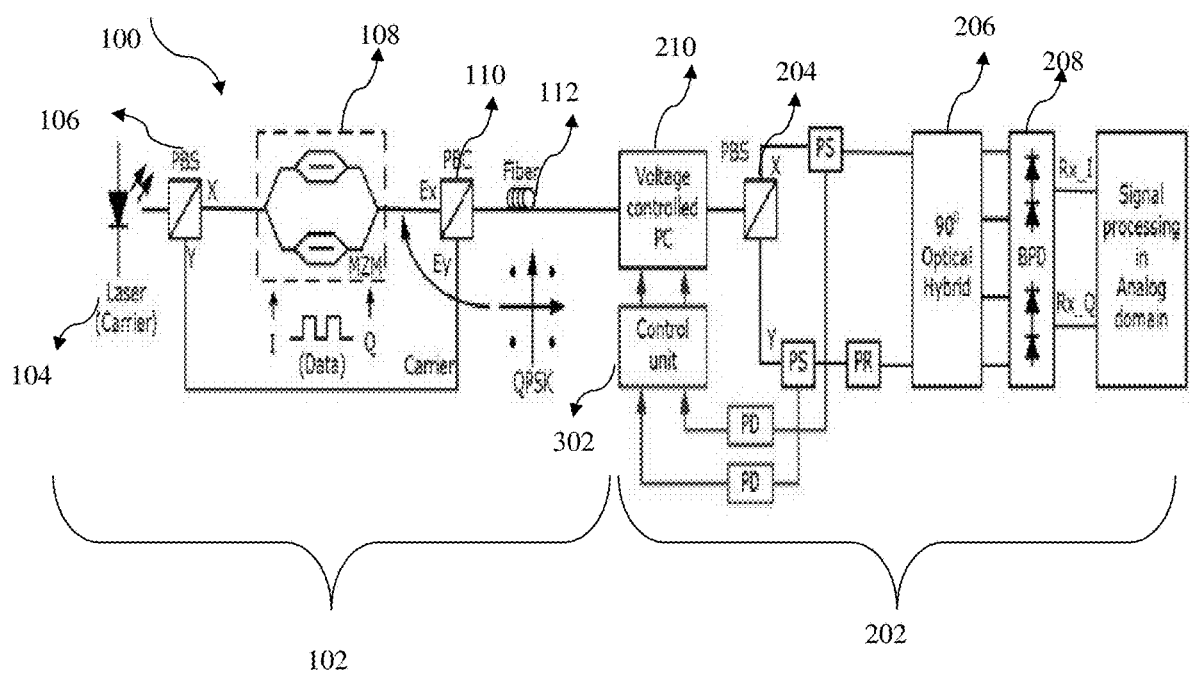
FIG. 3 illustrates the self-homodyne coherent optical transmission system (with QPSK modulation) with receiver using an adaptive polarization control based on minimizing optical power in one polarization, according to an embodiment as disclosed herein.

Referring to FIG. 3, the coherent transmission system 100 (with QPSK modulation) with receiver 202 using the adaptive polarization control based on maximization of power in one polarization and minimization of power in other polarization is shown. Optical power from one or both polarizations through power splitter (PS) is fed back through a control unit 302 for changing the control voltage of the polarization controller 212. The optical power should be converted in electrical domain before applying to control circuit.

Figure 4:
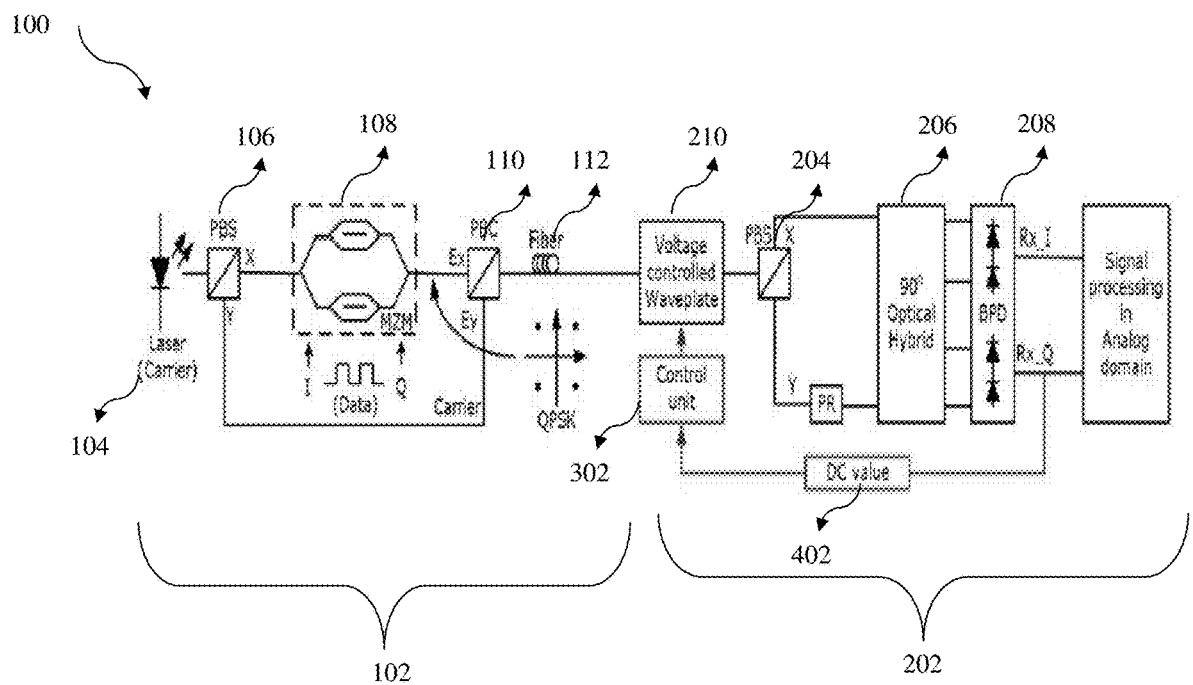
FIG. 4 illustrates the self-homodyne optical coherent transmission system with transmitter applying a QPSK modulation technique with an adaptive polarization control based on a minimization of DC value in quadrature component of received signal, according to an embodiment as disclosed herein.

Referring to FIG. 4, the self-homodyne optical coherent transmission system 100 with the transmitter 102 applying the QPSK modulation technique with the adaptive polarization control based on a minimization of DC value 402 in the quadrature component of the received signal is shown. A relation between DC values 402 of the received signals and an angle of Jones matrix ($\varphi$) is shown below in Equation (5) from derivations of the output signals of the receiver 202:

$$R_{X_I} = 4\alpha^2 A_{LO} A_S \cos(\theta_m + 2\varphi) - 4\beta^2 A_{LO} A_S \cos\theta_m + 4\alpha\beta [A_S^2 - A_{LO}^2]\cos\varphi,$$

$$R_{X_Q} = 4\alpha^2 A_{LO} A_S \sin(\theta_m + 2\varphi) + 4\beta^2 A_{LO} A_S \sin\theta_m + 4\alpha\beta [A_S^2 - A_{LO}^2]\sin\varphi. \quad \text{Equation (5)}$$

The DC values 402 of $R_{x1}$ and $R_{XQ}$ may then be used to find a value of $\varphi$ $$\varphi = \tan^{-1}\left(\frac{DC \text{ value of } R_{X_I}}{DC \text{ value of } R_{X_Q}}\right) \quad \text{Equation (6)}$$

DC value 402 in the quadrature component is used as a feedback element 402 fed back to the polarization controller 212 (shown as a voltage controlled waveplate) as shown in FIG. 4. By sending the DC value 402 as the feedback element, there is no need of optical to electrical conversion in the feedback path. An effect of $\varphi$ in the equation (6) may be reduced by minimizing the DC component.

As discussed above, the receiver 202 comprises the equalizer for providing dispersion compensation and/or carrier phase adjustment blocks for carrier phase recovery and/or compensation.

Figure 5:
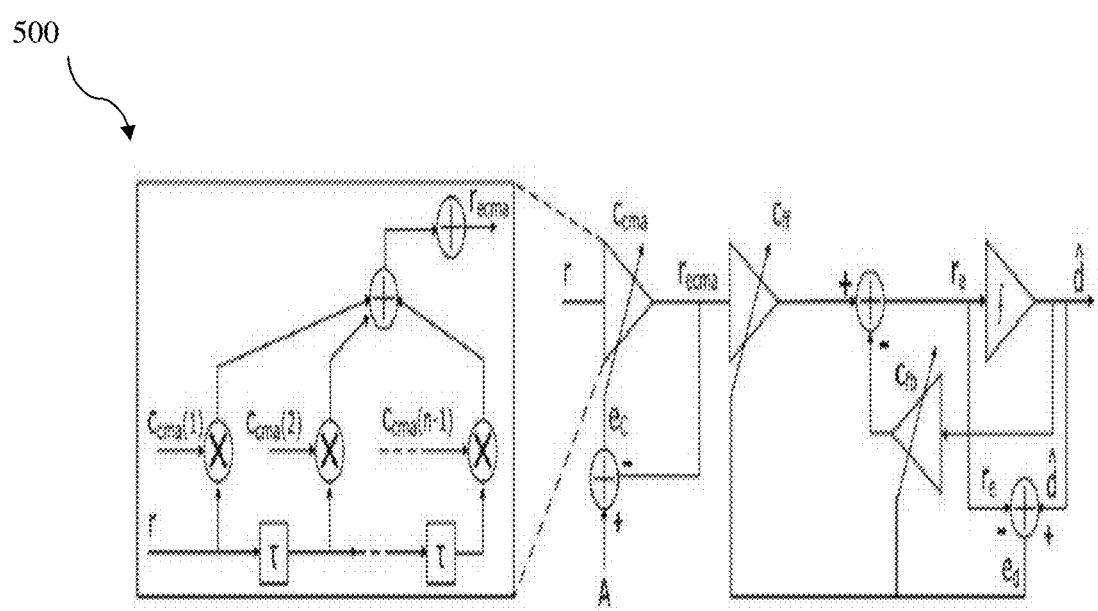
FIG. 5 illustrates an equalizer in the receiver of the self-homodyne optical coherent transmission system, according to an embodiment as disclosed herein.

In accordance with an embodiment, referring to FIG. 5, an architecture of the equalizer 500 is shown. The equalizer 500 comprises a CMA-Decision feedback equalizer (DFE) where DFE stage is cascaded with the CMA equalizer. DFE has feed forward and feedback taps and error of the DFE is based on the output of a decision device as shown in FIG. 5.

Equalization is required in the case of highly dispersed received signal for removing the inter symbol interference. A transversal filter may be used for implement one or more algorithms to be executed by the equalizer 500 for removing the inter symbol interference.

In an example embodiment, for a time varying channel, an adaptive equalization is required. In the adaptive equalization, tap coefficients continuously track and adapt the values according to the changes in channel characteristics. The equalizer 500 may reduce a mean square error by adjusting coefficient values. There may be different cost functions according to the system requirement.

For phase modulation techniques, modulus remains same for all symbols, mean square error may be obtained by comparing received signal with constant modulus. The equalizer 500 here may be called as the constant modulus algorithm (CMA) equalizer.

After a certain number of tap coefficients, the effect of increasing tap coefficients on output becomes very marginal. This is caused by over-fitting of tap coefficients values. The optimum output of the first CMA equalizer is fed to a second stage of decision feedback equalizer (DFE). As show in FIG. 5, tap coefficients of the first equalizer and error (ec) are updated based on CMA. Output of the CMA equalizer is applied to the DFE after settling the CMA equalizer coefficients.

From equation (7) below, the FF filter coefficients and the FB filter coefficients may be used for minimizing an error ($e_d$):

$$c_{cma} = c_{cma}^- + \mu e_c r^*, \; e_c = r_{ecma}[A^2 - |r_{ecma}|^2],$$

$$c_{ff} = c_{ff}^- + \mu_1 e_d r_{ecma}, \; e_d = \hat{d} - r_e,$$

$$c_{fb} = c_{fb}^- - \mu_2 e_d \hat{d}, \; r_e = c_{ff} r - c_{fb} \hat{d}. \quad \text{Equation (7)}$$

In equation (7) above, $\mu$, $\mu 1$ and $\mu 2$ are step sizes for the settling of CMA, FF and FB filter coefficients respectively and A is the modulus for the CMA. Here $c_{cma}$, $c_{ff}$ and $c_{fb}$ are weight coefficients of CMA, FF and FB filters respectively, $r_{ecma}$ is CMA equalized signal and $\hat{d}$ is the output of decision device. A DFE is directly driven by the CMA equalized data in blind mode and gives an extra benefit in terms of error vector magnitude (EVM) or bit error rate (BER). Cause of this improvement is different cost functions for both equalizers and lesser MMSE of DFE as compared to FF equalizers.

In another embodiment, a radius directed equalization may be performed by the equalizer 500. Architecture of the radius directed equalizer is similar to the CMA equalizer. Radius directed algorithm is a blind algorithm for multi modulus system like m-QAM where only one modulus value doesn't imply. Received sample (received from the receiver 202) is compared with all the possible values of modulus. A difference is computed between all applicant values of modulus and absolute value of the received signal. A minimum distance modulus is used for calculating error function and accordingly weights are updated. For example, in 16-QAM there are three modulus $a_1$, $a_2$ and $a_3$. Received sample $r_k$ is compared with all three available modulus values and $a_k$ is the modulus which has minimum distance with the received sample. Its tap coefficient update equation and error function equation are as follows:

$$c_{cma}[k] = c_{cma}[k-1] + \mu e_c[k] r_k, \; \forall k \geq 0$$

$$e_c = r_{ecma}[\alpha_k^2 - |r_{ecma}|^2]. \quad \text{Equation (8)}$$

In the case of 16-QAM, the output of the radius directed equalizer may be three rings if there is a need of carrier phase recovery. Here, algorithm will place received sample at one of the radius values. For SH-m-QAM system radius directed algorithm (RDE) is used. RDE cascaded with DFE also gives improvement in results.

Figure 6:
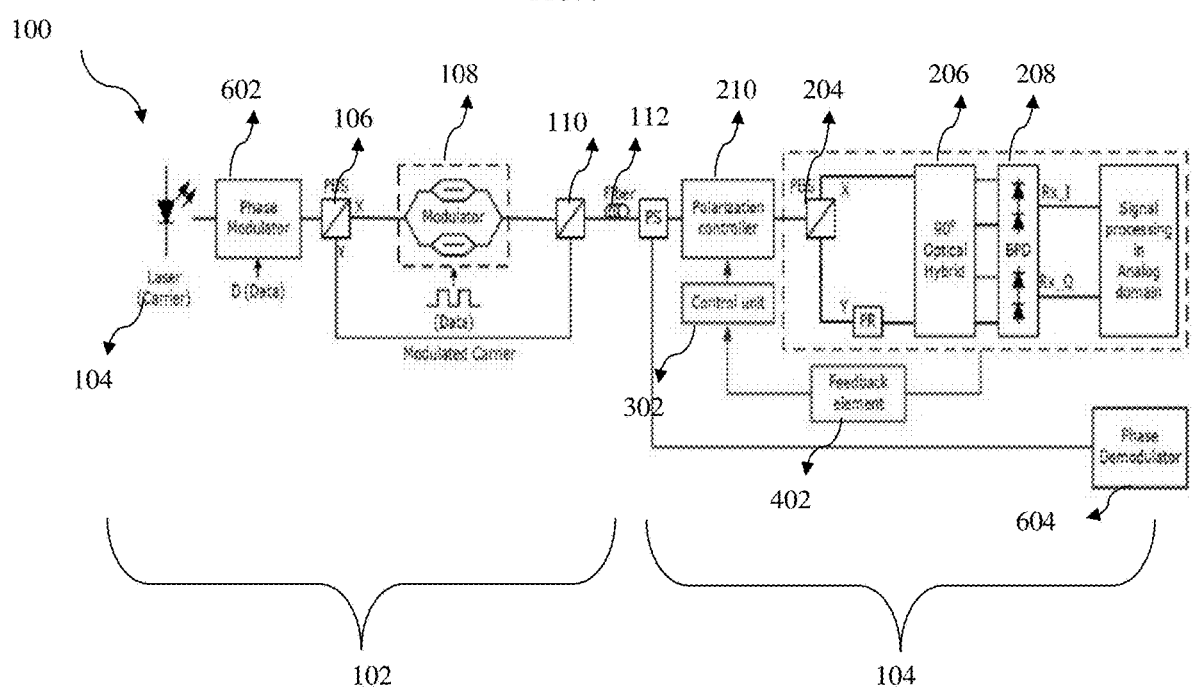
FIG. 6 illustrates the self-homodyne coherent optical transmitting system with a phase modulated carrier for the self-homodyne QPSK system, according to an embodiment as disclosed herein.

In an embodiment, referring to FIG. 6, the self-homodyne QPSK optical coherent transmitting system 100 with a phase modulated carrier is shown. In the present disclosure, the carrier may also be phase modulated by a phase modulator 602 to carry additional data along with and then may be polarization multiplexed with modulated signal. For QPSK modulation at the transmitter 102, phase modulated carrier is used as the carrier as shown in FIG. 6. The use of phase modulated carrier scheme may increase the data rate as bits per symbol will increase from n to n+1 without effecting the distance between the constellation points of signals. A phase demodulator 604 (referred to as the demodulator above) may be used at the receiver 202 end for demodulating from the modulated carrier.

In the optical coherent system 100 of FIG. 6, synchronization between phase modulated (PM)-LO signal and QPSK modulated PM-LO signal is required to provide a non-zero dispersion shifted fiber (NZDSF) channel as compared to SMF channel because of less dispersion. Pulse spreading due to dispersion may cause synchronization issues that may result in performance abjection for this scheme. For short distances, the optical coherent transmission system 100 of FIG. 6, may work with SMF fiber only.

In an embodiment, the receiver 202 may be implemented by using a photonic Integrated Circuit for the coherent transmission system 100 (SH system). Developments in photonic integrated circuits (and especially Silicon Photonics) may provide a big impact on optical communication systems. The photonic integrated circuits are known for compatibility with electronics and thus the configuration of the transmitter 102 and the receiver 202 with ICs, makes the optical coherent transmission system 100 very fast, compact and reliable, with significantly reduced power consumption. In the present disclosure, the optical receiver front end for optical coherent transmission system 100 (self-homodyne system) may further be implemented using photonic integrated circuits to satisfy future demands for low-power low cost data center interconnects. One or more building blocks such as the modulator, the polarization beam splitter/combiner, polarization controller may be constructed by using the photonic IC technologies. The one or more components of the transmitter 102 and the receiver 202 may be implemented along with the electronic components on one or more chips and may be packaged together in a compact form factor.

Figure 7:
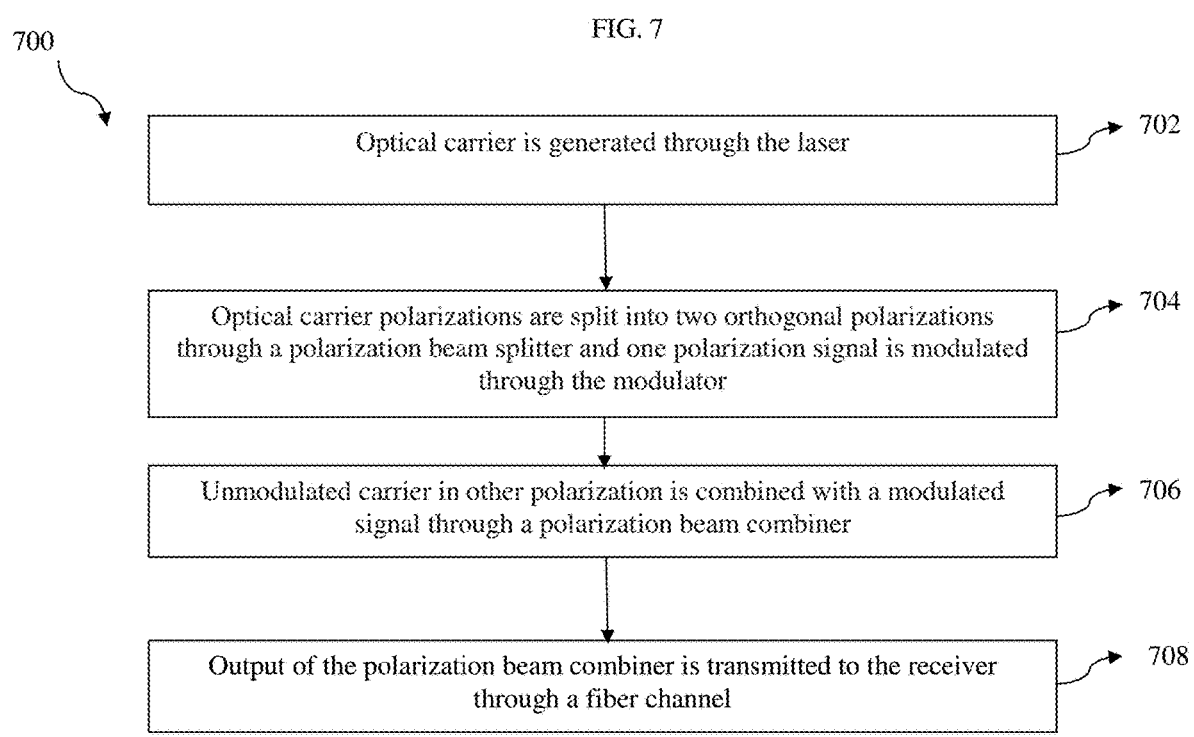
FIG. 7 illustrates a flow chart for a method of transmitting signal in the self-homodyne coherent optical transmission system, according to an embodiment ad disclosed herein.

Referring to FIG. 7, a method 700 for transmitting signal in the coherent optical transmission system 100 is shown. At step 702, the optical carrier is generated, through the laser 104 in a transmitter 102.

At step 704, the optical carrier polarizations are split into two orthogonal polarizations through the polarization beam splitter 106 and one polarization signal is modulated through the at least one modulator 108.

At step 706, the unmodulated carrier in other polarization is combined with the modulated signal through the polarization beam combiner 110.

At step 708, the output of the polarization beam combiner 110 is transmitted to the receiver 202 through the fiber channel 002. The optical carrier in one polarization is multiplexed with the message signal modulated over the carrier in another polarization and is transmitted over the fiber channel 002.

Figure 8:
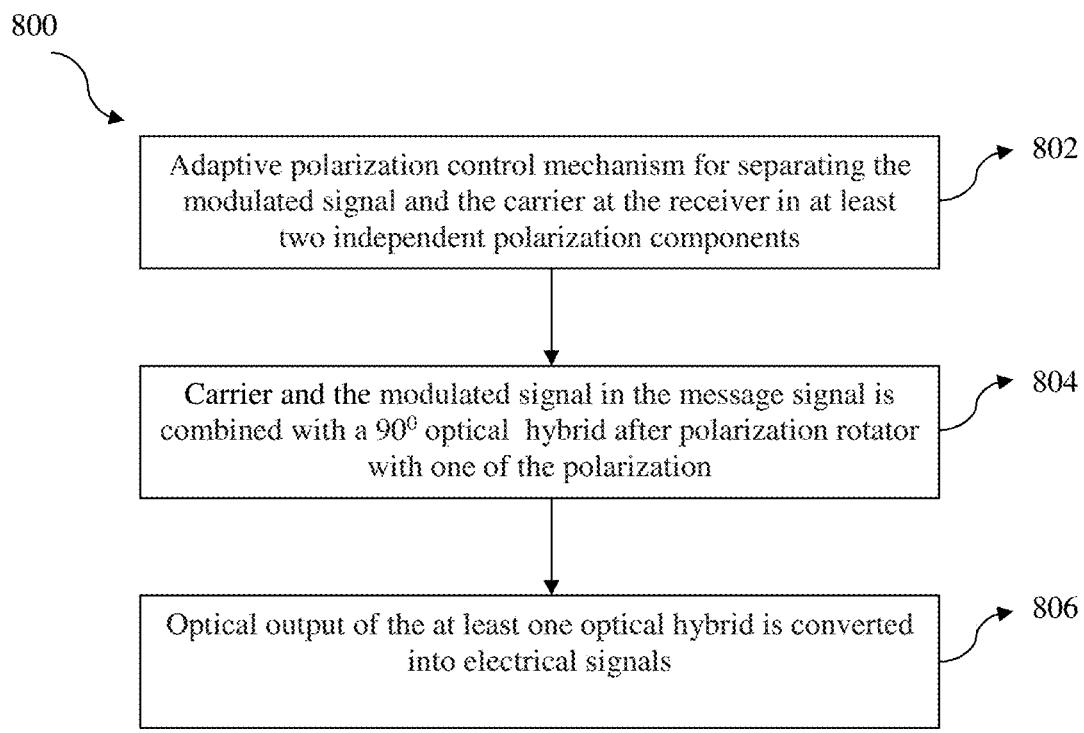
FIG. 8 illustrates a flow chart for a method of receiving signal in the self-homodyne coherent optical transmission system, according to an embodiment ad disclosed herein.

In accordance with an embodiment, referring to FIG. 8, a method 800 for receiving signal in the coherent optical transmission system 100 is provided.

At step 802, after receiving, the adaptive polarization control mechanism for separating the modulated signal and the carrier at the receiver in at least two independent polarization components is applied through the polarization controller 210.

At step 804, the carrier and the modulated signal in the message signal is combined with at least one 90° optical hybrid 206 after a polarization rotator with one polarization signal.

At step 806, the optical output of the at least one optical hybrid is converted into electrical signals through at least two balanced photo-detectors 208.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A self-homodyne coherent optical transmission system, comprising:
   a transmitter, comprising:
   a laser for generating an optical carrier,
   a polarization beam splitter for splitting the optical carrier into two orthogonal polarizations,
   at least one modulator for modulating a polarization signal for one of the two orthogonal polarizations, wherein a modulation technique for modulating the polarization signal comprises one of an m-QAM modulation technique or an m-PSK modulation technique,
   a polarization beam combiner for combining an unmodulated carrier in other polarization with a modulated signal, wherein an output of the polarization beam combiner is transmitted through a fiber channel,
   wherein the optical carrier in one polarization is multiplexed with a message signal modulated over the carrier in another polarization and is transmitted over the fiber channel; and
   a receiver for receiving a message signal from transmitter through the fiber channel and demodulating the message signal using a polarization multiplexed carrier as a local oscillator, the receiver comprising:
   at least one 90° optical hybrid for combining a carrier and a modulated signal in the message signal, comprising at least one polarization beam splitter that splits the incoming optical signal from the fiber channel into two orthogonal polarizations,
   at least two balanced photo-detectors for converting an optical output of the at least one 90° optical hybrid into electrical signals, and
   a polarization controller for applying an adaptive polarization control mechanism for separating the modulated signal and the carrier at the receiver in two independent polarization components;
   wherein the adaptive polarization control mechanism is performed by the receiver for feedback control of the polarization controller for minimizing an amount of cross-polarization to separate the modulated signal and the carrier into two independent polarization components; and wherein optical power from at least one of the at least one polarization beam splitter outputs is further split, and given to at least one photodetector, and wherein output from the at least one photodetector is used for performing the adaptive polarization control mechanism by at least one of maximization of power in one polarization and minimization of power in other polarization.

2. The self-homodyne coherent optical transmission system as claimed in claim 1, wherein optical carrier power present in the first polarization is at least 10 dB above a modulated signal power present in the second polarization.

3. The self-homodyne coherent optical transmission system as claimed in claim 1, wherein the adaptive polarization control mechanism uses a magnitude of DC component in the electrical signals received from at least one balanced photo detector for feedback control of the polarization controller.

4. The self-homodyne coherent optical transmission system as claimed in claim 1, wherein the receiver comprises an equalizer, wherein the equalizer uses a combination of RDE and decision feedback equalizer for an m-QAM modulation technique.

5. The self-homodyne coherent optical transmission system as claimed in claim 4, wherein the Equalizer uses at least one of a constant modulus algorithm (CMA) and a decision feedback equalization technique for an m-PSK modulation technique.

6. The self-homodyne coherent optical transmission system as claimed in claim 4, wherein the equalizer processes high-speed signals in analog domain.

7. The self-homodyne coherent optical transmission system as claimed in claim 1, wherein the optical carrier in the transmitter is phase modulated to carry data prior to the data being transmitted to the polarization beam splitter.

8. The self-homodyne coherent optical transmission system as claimed in claim 7, wherein the receiver comprises:
a demodulator for demodulating data from the modulated optical carrier.

9. The self-homodyne optical coherent transmission system as claimed in claim 1, wherein the receiver comprises:
an optical dispersion compensation module for reducing chromatic dispersion.

10. The self-homodyne optical coherent transmission system of claim 1, wherein fiber channel comprises:
a dispersion shifted fiber for avoiding a chromatic dispersion.

11. The self-homodyne optical coherent transmission system of claim 1, wherein the fiber channel comprises:
a transmission wavelength at which dispersion is less or negligible.

12. A receiver in a self-homodyne coherent optical transmission system, the receiver comprising:
at least one 90° optical hybrid for combining a carrier and a modulated signal in a message signal, received from a transmitter, wherein the message signal is demodulated by using a polarization multiplexed carrier as a local oscillator, comprising at least one polarization beam splitter that splits the incoming optical signal from the fiber channel into two orthogonal polarizations;
at least two balanced photo-detectors for converting an optical output of the at least one 90° optical hybrid into electrical signals; and
a polarization controller for applying an adaptive polarization control mechanism for separating the modulated signal and the carrier at the receiver in at least two independent polarization components;
wherein the adaptive polarization control mechanism is performed by the receiver by using electronics for identifying an amount of cross-polarization from each of received signal parameters for feedback control of the polarization controller for minimizing the amount of cross-polarization comprising at least one polarization beam splitter that splits the incoming optical signal from the fiber channel into two orthogonal polarizations; and
wherein optical power from at least one of the at least one polarization beam splitter outputs is further split, and given to at least one photodetector, and wherein output from the at least one photodetector is used for performing the adaptive polarization control mechanism by at least one of maximization of power in one polarization and minimization of power in other polarization.

13. A method for receiving signal in a self-homodyne coherent optical transmission system, the method comprising:
receiving, a message signal from a transmitter through an optical fiber channel;
applying, through a polarization controller, an adaptive polarization control mechanism for separating a modulated signal and a carrier at the receiver in at least two independent polarization components;
wherein the adaptive polarization control mechanism is performed by the receiver by using electronics for identifying an amount of cross-polarization from each of received signal parameters for feedback control of the polarization controller for minimizing the amount of cross-polarization to separate the modulated signal and the carrier into two independent polarization components;
combining, through at least one 90° optical hybrid, a carrier in one polarization and a modulated signal in the other polarization after a polarization rotator with one polarization signal; and
converting, through at least two balanced photo-detectors, an optical output of the at least one 90° optical hybrid into electrical signals; and
wherein optical power from at least one of at least one polarization beam splitter outputs is further split, and given to at least one photodetector, and wherein output from the at least one photodetector is used for performing the adaptive polarization control mechanism by at least one of maximization of power in one polarization and minimization of power in other polarization.

* * * * *